United States Patent
Sasaki et al.

(12) 
(10) Patent No.: US 6,214,935 B1
(45) Date of Patent: Apr. 10, 2001

(54) INTERMEDIATE SOFTENING POINT RESIN-BASED HOT MELT PSAS

(75) Inventors: Yukihiko Sasaki, Claremont; Jesse C. Ercillo, Covina, both of CA (US); Catharina Eyken, Alphen aan de Rijn (NL); Le Hoa Hong, Monterey Park, CA (US); Henk de Koning, Zevenhuizen (NL)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/115,878

(22) Filed: Jul. 15, 1998

(51) Int. Cl.⁷ ............... C08L 53/02; B44C 7/04
(52) U.S. Cl. ............... 525/89; 525/98; 525/99; 524/270; 524/274; 524/484; 524/494; 428/355; 156/241
(58) Field of Search ............... 525/89, 98, 99; 524/270, 274, 484, 494; 428/355; 156/241

(56) References Cited

U.S. PATENT DOCUMENTS

| | | | |
|---|---|---|---|
| 3,509,239 | 4/1970 | Tindall | 260/889 |
| 3,577,398 | 5/1971 | Pace et al. | 260/85.3 |
| 3,692,756 | 9/1972 | St. Cyr | 260/80.7 |
| 3,787,531 | 1/1974 | Dahlquist et al. | 260/876 B |
| 3,872,064 | 3/1975 | Pace et al. | 260/80.7 |
| 3,880,953 | 4/1975 | Downey | 260/876 B |
| 3,932,328 | 1/1976 | Korpman | 260/27 BB |
| 4,060,503 | 11/1977 | Feeney et al. | 260/5 |
| 4,080,348 | 3/1978 | Korpman | 260/27 BB |
| 4,104,327 | 8/1978 | Inoue et al. | 260/876 B |
| 4,125,665 | 11/1978 | Bemmels et al. | 428/352 |
| 4,288,480 | 9/1981 | Grzywinski et al. | 428/40 |
| 4,325,770 | 4/1982 | Korpman | 156/230 |
| 4,411,954 | 10/1983 | Butch, III et al. | 428/343 |
| 4,418,120 | 11/1983 | Kealy et al. | 428/343 |
| 4,619,851 | * 10/1986 | Sasaki et al. | 428/40 |
| 4,726,982 | 2/1988 | Traynor et al. | 428/213 |
| 5,290,842 | 3/1994 | Sasaki et al. | 524/271 |
| 5,663,228 | 9/1997 | Sasaki et al. | 524/271 |
| 5,750,623 | * 5/1998 | Diehl et al. | 524/271 |

FOREIGN PATENT DOCUMENTS

| | | |
|---|---|---|
| 0238135A2 | 9/1987 | (EP) . |
| 0 455 105 A2 | 11/1991 | (EP) . |
| 0656410A1 | 6/1995 | (EP) . |
| 1 447 419 | 8/1976 | (GB) . |
| WO 91/13935 | 9/1991 | (WO) . |
| WO9710310 | 3/1997 | (WO) . |

OTHER PUBLICATIONS

Rubber World Magazine; Blue Book; 1987 Edition; "Materials, Compounding Ingredients and Machinery for Rubber"; pp. 440–474; Lippincott & Peto Publications.

Donatas Satas (Ed.); Handbook of Pressure Sensitive Adhesive Technology; Earle E. Ewins, Jr. et al.; "Thermoplastic Rubbers: A–B–A Block Copolymers"; Chapter 13, pp. 317–373; Van Nostrand Reinhold 1989 Publication.

Donatas Satas (Ed.); Handbook of Pressure Sensitive Adhesive Technology; James A. Schaldeman; "Tackifier Resins"; Chapter 20, pp. 527–544; Van Nostrand Reinhold 1989 Publication.

Legge, Norman R. et al.; Thermoplastic Elastomers, A Comprehensive Review; Chapter 13, pp. 494–495; 1987 Macmillan Publication.

* cited by examiner

*Primary Examiner*—James J. Seidleck
*Assistant Examiner*—Olga Asinovsky
(74) *Attorney, Agent, or Firm*—Christie, Parker & Hale, LLP

(57) ABSTRACT

An improved hot-melt pressure-sensitive adhesive (HMPSA) composition contains an elastomeric component, such as a blend of SIS and SB block copolymers, and a tackifying component comprising one or more intermediate softening point resins (ISPRs) having a ring and ball softening point of from 35 to 60° C. The improved adhesive compositions are characterized by reduced volatility, less bleed and staining tendencies, and improved overall adhesive performance. The invention also provides improved label constructions in which a release liner is coated with an HMPSA composition and laminated to a flexible facestock. Notably, even when low basis weight paper facestocks are used, the construction can be converted at high speeds.

13 Claims, No Drawings

INTERMEDIATE SOFTENING POINT RESIN-BASED HOT MELT PSAS

FIELD OF THE INVENTION

The present invention is directed to hot melt pressure-sensitive adhesives (PSAs) based on elastomeric components tackified with intermediate softening point resins.

BACKGROUND OF THE INVENTION

Adhesive labels and tapes are well known. In a typical label construction, one or more layers of adhesive are coated on or otherwise applied to a release liner, and then laminated to a facestock, such as paper, polymeric film, or other ink-receptive, flexible material. In a typical tape construction, a polymeric film or woven paper is coated with an adhesive on one surface, which is then wound up upon itself. A release liner is not generally required. Labels are usually die-cut and matrix-stripped before use. In contrast, tapes usually do not require die-cutting and matrix-stripping, and generally need not be ink-receptive.

The adhesives used in both tapes and labels include pressure-sensitive adhesives (PSAs). Both rubber-based and acrylic-based PSAs are known; most contain one or more tackifiers that improve overall adhesion to various substrates. PSAs can be applied to a release liner or facestock from an organic solvent, from an aqueous dispersion, or as a hot melt. Hot melt PSAs (HMPSAs) are highly desirable, as the absence of solvent or water lowers the energy required to form the adhesive layer and reduces the environmental problems associated with solvent-borne adhesives. However, most HMPSAs are somewhat volatile and contain volatile organic compounds (VOCs).

A typical rubber-based HMPSA composition contains one or more natural or synthetic elastomers, tackified with a petroleum resin and/or other ingredients, such as plasticizers, that improve the tack of the adhesive. Certain elastomeric block copolymers, such as Shell's Kraton® block copolymers are widely used as the polymeric components in HMPSAs.

Natural and synthetic elastomers containing polybutadiene segments and polyisoprene segments are not generally miscible with each other. It is known in the art, however, to mix immiscible elastomeric polymers based on polybutadiene and polyisoprene. Homopolymers are generally more difficult to employ then styrenic block copolymers. With styrenic block copolymers, while the midblocks are immiscible, the end blocks of polystyrene form one common domain, thus stabilizing the mixture and eliminating some or all of the problematic effects of incompatibility, such as separation of the elastomeric phases over time.

One problem with PSAs based on tackified elastomeric blends is diffusion and migration of tackifiers and other species into the facestock. As a result, the facestock may become stained over time, and the construction may lose some adhesion. Although an intermediate barrier layer can be positioned between the facestock and the adhesive, such an approach complicates the manufacturing process and increases the cost of the construction.

During label manufacture, a laminate of a facestock, PSA layer and a release liner is passed through apparatus that converts the laminate into commercially useful labels and label stock. The processes involved in the converting operation include printing, die-cutting and matrix-stripping to leave labels on a release liner, butt-cutting of labels to the release liner, marginal hole punching, perforating, fan folding, guillotining and the like. Die-cutting involves cutting of the laminate to the surface of the release liner. Hole punching, perforating and guillotining involve cutting cleanly through the label laminate.

The cost of converting a laminate into a finished product is a function of the speed and efficiency at which the various processing operations occur. While the nature of all layers of the laminate can impact the ease and cost of convertibility, the adhesive layer typically has been the greatest limiting factor in ease of convertibility. This is due to the viscoelastic nature of the adhesive, which hampers precise and clean penetration of a die in die-cutting operations and promotes adherence to die-cutting blades and the like in cutting operations. Stringiness of the adhesive also impacts matrix-stripping operations, which follow die-cutting operations.

Achieving good convertibility does not, by necessity, coincide with achieving excellent adhesive performance. Adhesives must be formulated to fit specific performance requirements, including sufficient shear, peel adhesion, tack or quick stick, at various temperatures. A good, general purpose adhesive may exhibit poor convertibility simply because the adhesive is difficult to cleanly cut. Such an adhesive may stick to a die or cutting blade during converting operations. In general, the softer the elastomer(s) and resin(s) used in the composition, the more readily the adhesive will adhere to a surface. However, if the composition is too soft and tacky, its cohesive strength (shear strength) will be low, and the composition may split or shear easily under stress, or ooze under pressure. An ideal HMPSA would have both high tack and high cohesive strength and, in addition, would have good flow characteristics if it is to be used in the bulk state, so that it can be coated or otherwise applied to a facestock or, coated on a release liner and laminated to a facestock.

A variety of petroleum resins and other compounds are used as PSA tackifiers. For Kraton® type block copolymers, it is known to use tackifiers prepared according to the teachings of U.S. Pat. Nos. 3,577,398 (Pace) and 3,692,756 (St. Cyr), wherein the tackifiers are obtained by polymerization of a stream of aliphatic petroleum derivatives in the form of dienes and monoolefins containing five or six carbon atoms. The resulting petroleum resins typically are normally liquid at room temperature or normally solid at room temperature, and generally have low or high softening points, respectively. Intermediate softening point resins, however, have heretofore either not been readily available or not utilized in the tackification of block copolymer elastomers.

HMPSAs formulated with the resins described in the aforementioned two patents tend to exhibit poor adhesion to corrugated cardboard substrates. In addition, unless one or more plasticizing components is included in the formulation, HMPSAs tackified with such resins generally cannot be used across a wide range of application temperatures. What is needed is an HMPSA composition having low volatility that adheres well to a variety of substrates over a broad temperature range, and that does not exhibit substantial bleed or facestock staining.

SUMMARY OF THE INVENTION

According to the present invention, improved hot melt pressure-sensitive adhesive (HMPSA) compositions and label constructions are provided. The adhesive compositions are characterized by reduced volatility, improved overall adhesive performance, and less bleed and staining tendencies, especially into paper facestocks. Label constructions made with the new HMPSAs can be applied to a variety of substrates over a wide range of application temperatures, and are ideally suited for general purpose permanent (GPP) label applications, including industrial labeling of bottles and other articles.

In one embodiment of the invention, an improved HMPSA comprises one or more elastomers and an intermediate softening point resin (ISPR) having a ring and ball softening point of from about 35 to 60° C. and an aromatic content of from about 5 to 25%, more preferably about 5 to 15% by weight. One such ISPR is made by copolymerizing at least one $C_5$ monoolefin or diolefin with at least one monoalkenyl aromatic hydrocarbon. Other ISPRs have essentially no (0%) aromatic content. The HMPSA composition has a volatility of less than about 10% by weight, as determined by thermogravimetric analysis (TGA).

In another embodiment of the invention, an improved HTMPSA composition comprises a blend of at least two elastomers, including a first styrenic elastomer selected from the group consisting of SIS block copolymers, SI block copolymers, multiarmed $(SI)_x$ block copolymers where x has a value of three or more, radial block copolymers comprising an SI backbone and I and/or SI arms, and mixtures thereof, and a second styrenic elastomer selected from the group consisting of SBS block copolymers, SB block copolymers, multiarmed $(SB)_x$ block copolymers where x has a value of three or more radial block copolymers comprising an SEBS backbone and I and/or SI arms, and mixtures thereof; and a tackifying component comprising at least one ISPR as described above. In some embodiments, the composition further comprises a small amount (up to about 10% by weight), of one or more normally solid tackifiers or normally liquid tackifiers. Small amounts of antioxidants, fillers, pigments, and other additives can be included in the formulation.

The invention also provides improved PSA label stock and label constructions characterized by low volatility, low facestock stain and bleed, good convertibility, and good adhesion to a variety of substrates over a wide range of application temperatures. In one embodiment, an improved PSA label construction comprises a flexible facestock and a HMPSA composition as described above, coated on or otherwise applied to the facestock. Notably, even when low basis weight paper facestocks are used, such as a 50 pound per ream (#/r) paper facestock, the resulting construction can be converted at high speeds. This is believed to be a direct consequence of the use of ISPRS, which impart desired tack to the composition without hampering converting operations like die-cutting and matrix-stripping.

DETAILED DESCRIPTION OF THE INVENTION

In accordance with the present invention, improved HMP-SAs are provided and comprise an elastomeric component tackified with an intermediate softening point resin (ISPR). Preferably, a blend of elastomers is used. When coated on or laminated to a 60 pound per ream high gloss white paper facestock at a coat weight of 20±2 g/m², the compositions exhibit no facestock staining, even after two weeks at 60° C. Label constructions made with the new HMPSA compositions can achieve high speed converting, even when low (50 pound per ream) facestocks are employed.

The elastomers used in the present invention are natural or synthetic elastomeric polymers, including, for example, polybutadiene, polyisoprene (both natural rubber and synthetic polymers); and, more preferably, AB, ABA, and "multiarmed" $(AB)_x$ block copolymers, where for example, A is a polymerized segment or "block" of at least one monoalkenylarene, such as styrene, alpha-methyl styrene, vinyl toluene and the like, B is an elastomeric, conjugated polybutadiene or polyisoprene block, and x has a value of three or more. Other radial block copolymers (described below) may also be employed.

In one embodiment of the invention, the elastomeric component comprises an SIS block copolymer, or a mixture of SIS and SI block copolymers, where "S" denotes a polymerized segment or "block" of styrene monomers and "I" denotes a polymerized segment or "block" of isoprene monomers. More generally, the elastomeric component comprises a first styrenic elastomer, for example SIS block copolymers, SI block copolymers, multiarmed $(SI)_x$ block copolymers where x is 3 or more, radial block copolymers comprising an SI backbone and I and/or SI arms, and mixtures of such copolymers. The elastomeric component may, and preferably does, further comprise a second styrenic elastomer, for example SBS block copolymers, SB block copolymers, multiarmed $(SB)_x$ block copolymers where x is 3 or more, radial block copolymers comprising an SEBS backbone and I and/or SI arms (where "E" and "B" are, respectively, polymerized segments of ethylene and butylene), and mixtures thereof. Other nonlimiting examples of elastomers are polybutadiene and polyisoprene. Particularly preferred are mixtures of SIS and SI block copolymers, or mixtures of SIS, SI and SB block copolymers.

Monoalkenylarene block copolymers can be prepared using anionic polymerization techniques that are well known in the art. Commercially available isoprene-based elastomers useful in the practice of the present invention include linear SIS and/or SI block copolymers, for example, Quintac 3433 and Quintac 3421, available from Nippon Zeon Company, Ltd. (U.S. sales office—Louisville, Ky.); Vector DPX 559, Vector 4111 and Vector 4113, available from Dexco, a partnership of Exxon Chemical Co. (Houston, Tex.) and Dow Chemical Co. (Midland Mich.); and Kraton® rubbers, such as Kraton 604x, Kraton D-1117, Kraton D-1107 and Kraton D-1113, available from Shell Chemical Co. (Houston, Tex.). Kraton D-1107 is a predominantly SIS elastomer containing about 15% by weight SI block copolymers. Kraton 604x is an SIS elastomer containing about 55% SI block copolymers. Kraton D-1320X is an example of a commercially available $(SI)_xI_y$ multiarmed block copolymer in which some of the arms are polyisoprene blocks. Commercially available butadiene-based elastomers include SBS and/or SB rubbers, for example Kraton D-1101, D-1102 and D-1118X, from Shell Chemical Co.; and Solprene 1205, a SB block copolymer available from Housemex, Inc. (Houston, Tex.). Other examples of commercially available block copolymers useful in the practice of the present invention include Kraton TKG-101 (sometimes called "Tacky G"), a radial block copolymer having an SEBS backbone and I and/or SI arms. Kraton G elastomers such as Kraton G-1657, however, are not generally appropriate as they do not yield a useful PSA when mixed with an ISPR.

In general, the elastomers comprise about 20 to 50%, more preferably about 25 to 40%, by weight of the total HMPSA composition, with the balance of the composition (about 50 to 80%, more preferably about 60 to 75% by weight) primarily consisting of tackifying resins. Particularly preferred HMPSA compositions contain a blend of (a) SB block copolymers and (b) SIS block copolymers (or a mixture of SIS and SI block copolymers), with a weight ratio of butadiene-based elastomer(s) to isoprene-based elastomers of from about 0.5:1 to 2:1. At weight ratios above 2:1, low temperature adhesive performance suffers. In one embodiment of the invention, such a composition comprises from about 10–20% by weight SB block copolymers and 10–25% by weight SIS (or SIS/SI) block copolymers, with the balance comprising a tackifying component and, preferably, a minor amount of antioxidant. Fillers, such as calcium carbonate, also can be added to the formulation.

The elastomer(s) is (are) tackified with a tackifying component or system that comprises at least one ISPR. ISPRs are hydrocarbon resins that are semi-solid materials at room temperature. Although they appear solid, in fact, they are highly viscous materials and will flow over time. Such resins have softening points ranging from about 35° C. to 60° C., more preferably within the range of about 50 to 60° C. Preferred ISPRs have an aromatic content of from about 5 to 25% by weight, more preferably, from about 5 to 15%, based on the weight of the resin, and a volatility less than about 10% by weight, as determined by thermogravimetric analysis (TGA). Although less preferred, ISPRs with very low aromatic content (0 to 5% by weight) can be employed, particularly if a rosin or similar polar tackifier, such as a rosin ester, is included in the HMPSA formulation. The rosin or rosin ester boosts adhesion to cardboard.

ISPRs are manufactured by Hercules Inc. and Exxon Chemical Co. (both of Houston, Tex.). A particularly preferred ISPR is Res-A-2514 from Hercules, a modified $C_5$-type petroleum resin with approximately 5 to 25% aromatic content (primarily $C_8$ and/or $C_9$ compounds), made by copolymerizing one or more $C_5$ monoolefins and/or diolefins with one or more $C_8$ or $C_9$ monoalkenyl aromatic hydrocarbons. Nonlimiting examples of $C_5$ monoolefins and diolefins are isoprene, 2-methyl-1-butene, 2-methyl-2-butene, cyclopentene, 1-pentene, cis- and trans-2-pentene, cyclopentadiene, and cis- and trans-1,3-pentadiene. Nonlimiting examples of $C_8$ and $C_9$ monoalkenyl aromatic compounds are styrene, methyl styrene, and indene. Another example of an ISPR is ECR-185, made by Exxon Chemical Co.

Res-A-2514 and ECR-185 have softening points intermediate that of normally liquid resins and normally solid resins, and are semi-solid at ambient temperature. At the low deformation frequencies encountered in bonding processes (i.e, application of an adhesive construction to a substrate), ISPRs flow, thereby imparting good wettability to the adhesive system. But unlike conventional liquid resins or plasticizing oils, ISPRs behave more like solid resins at high deformation frequencies, increasing the storage modulus of the adhesive system and enhancing die-cutting and converting performance. ISPRs appear to compatibilize the two immiscible elastomers, which then tend to exhibit a single glass transition temperature peak in a dynamic mechanical spectrum (DMS). However, in some embodiments, two glass transition temperatures may be observed.

Advantageously, adhesive formulations incorporating ISPRs have lower percent volatiles than those formulated with a liquid resin and plasticizing oil, and can be applied over a broader range of temperatures than similar systems formulated with normally liquid and/or normally solid resins and plasticizing oils. In addition, heat-aging studies indicate that the ISPR-based HMPSAs have less bleed and staining tendencies than HMPSAs formulated with liquid tackifiers and plasticizers.

Although an ISPR can be used in lieu of a normally liquid resin and a plasticizer, or a blend of normally liquid and normally solid resins, in some embodiments of the invention it is advantageous to include a small amount of a normally solid or normally liquid tackifier in order to adjust the glass transition temperature of the HMPSA. Normally solid tackifiers are those which, when prilled, tend to remain prilled, even under hot and humid conditions. They tend to have softening points greater than about 80° C., and are solid at or near room temperature (20–25° C.). In contrast, normally liquid tackifiers are liquids at room temperature, with softening points less than about 20° C. If normally solid and/or liquid tackifiers are included in the formulation, they are present in an amount of no more than about 10% by weight respectively, based on the total weight of elastomers and tackifiers.

Nonlimiting examples of normally solid and normally liquid tackifiers include the Wingtack® family of resins sold by the Chemical Division of Goodyear Tire and Rubber Company (Akron, Ohio). Wingtack® resins have a numerical designation that corresponds to the softening point of the resin, i.e., Wingtack® 95 is normally a solid at room temperature, with a softening point of about 95° C., and Wingtack® 10 is normally a liquid at room temperature, with a softening point of about 10° C. Other normally solid tackifiers include Escorez 1304, Escorez 1310-LC, and Escorez 2596, manufactured by Exxon Chemical Co. (Houston, Tex.), and Piccotac 95, manufactured by Hercules Inc. (Wilmington, Del.). Solid and liquid tackifiers can be prepared by polymerization of a stream of aliphatic petroleum derivatives in the form of dienes and monoolefins, in accordance with the teachings of U.S. Pat. Nos. 3,577,398 and 3,692,756.

Although not preferred, in some embodiments the HMPSA composition contains additional tackifiers, such as rosins, rosin esters, and polyterpenes, and/or a plasticizer, such as Shellflex 371 (manufactured by Shell Chemical Co.) and Kaydol Mineral Oil (manufactured by Witco Chemical Corp., Houston, Tex.). The additional tackifiers and/or plasticizers can be added to the formulation to adjust the $T_g$, viscosity, or other properties of the HMPSA. If plastisizers are included, they are present in an amount of no more than about 7% by weight.

In addition to the elastomers and tackifiers, preferred HMPSA compositions contain a small amount (e.g., about 5 to 8% by weight , based on the weight of all components) of one or more additives or fillers. Nonlimiting examples of such components include antioxidants, such as Irganox 565 and Irgafos 168, both available from the Ciba Additives Division of Ciba-Geigy Corp. (Terrytown, N.Y.); calcium carbonate; and pigments. Antioxidants inhibit oxidative degradation of the adhesive. Calcium carbonate improves the cuttability of the resulting label construction.

The HMPSA compositions are prepared in a conventional manner by blending together elastomers, tackifier(s), and other components in a batch or semi-batch mixer, or in a screw extruder, at elevated temperature, preferably in an inert atmosphere. Laboratory scale compounding is conveniently carried out in a sigma-blade mixer, while commercial scale production may be more efficient using a twin-screw extruder, as described in *Adhesives Sealants & Industry*, June/July 1998, at pages 44–51, incorporated by reference herein.

HMPSAs prepared in accordance with the invention are useful in preparing improved label stock and label constructions. To that end, an HMPSA is coated on or otherwise applied to a facestock or, more preferably, coated on a release liner (such as a siliconized Kraft paper liner, well known in the art) and then laminated to a facestock. The construction can be slit, die-cut, matrix-stripped, and/or converted in other ways. The release liner, of course, protects the HMPSA prior to application to a substrate.

A wide variety of flexible materials can be used as facestocks, including paper, cardboard and polymeric film materials, such as polyolefins (e.g., polyethylene, polypropylene, ethylene-propylene copolymers, etc.). An unexpected advantage of the invention is the ability to use relatively low basis weight paper facestocks (i.e., 50#/r) and still achieve sustainable high speed converting (i.e., die-cutting and matrix-stripping). In contrast, most general purpose permanent labels use higher basis weight (e.g., 60#/r) facestocks in order to improve high-speed converting operations.

The following examples are illustrative of the invention.

EXAMPLE 1 AND CONTROL 1

Using a one liter, sigma-blade mixer heated to 350° F. (165° C.), HMPSA compositions were prepared by blending together elastomers, tackifiers, and antioxidants, under nitrogen, for about 50 minutes, using the general compounding procedure presented below. Example 1 was formulated in accordance with the present invention, while Control 1 contained a normally liquid tackifier and a plasticizer, but no ISPR.

| Time (min.) | Component Added to Mixer |
|---|---|
| 0:00 | Resin I + Antioxidant |
| 0:02 | SB (all) |
| 0:05 | SIS/SI (all) |
| 0:25 | Resin II |
| 0:28 | Resin III (where % ISPR > 60 and Wingtack ® 10 is present) |
| 0:30 | Resin IV |
| 0:35 | Resin V or Wingtack ® 10 |
| 0:50 | Remove adhesive from mixer, | where Resin I=(Mass of SB+SIS/SI)/C, where C=1.3 to 1.6 for formulations containing <40% ISPR and no Wingtack® 10, and C=1.6 to 2.3 for formulations containing Wingtack® 10 and >40% ISPR; Resin II=1/5 of (total ISPR-Resin I); Resin III=2/5 of (total ISPR-Resin I); Resin IV=2/5 of (total ISPR-Resin I); and Resin V=2/5 of (total ISPR-Resin I). Control 1 was made using a similar compounding procedure, with a plasticizer added to the mixer after all of the elastomers and tackifiers had been added.

After the adhesives were formulated, percent volatiles were determined by thermogravimetric analysis (TGA). Measurements were obtained in Normal TGA mode using a TA Instruments 2950 Hi-Res TGA with 4900 Analyzer. A sample of each of Example 1 and Control 1 was weighed, and then heated from room temperature to 160° C. at 40° C./min., under $N_2$. Each sample was held at 160° C. for six hours, and its weight loss as a function of time was measured.

Table 1 provides composition and volatility data (% weight loss after aging) for Example 1 and Control 1. Component amounts are expressed in grams.

TABLE 1

HMPSA COMPOSITIONS AND VOLATILITY

| COMPONENT OR PROPERTY | EXAMPLE 1 | CONTROL 1 |
|---|---|---|
| Kraton 1107 (SIS, SI) | 19.1 | 19.1 |
| Solprene 1205 (SB) | 16.4 | 16.4 |
| Escorez 2596[1] | 9.0 | 46.7 |
| Res-A-2514[2] | 55.5 | — |
| Wingtack ® 10[3] | — | 10.1 |
| Shellflex 371[4] | — | 7.7 |
| TOTAL | 100 | 100 |
| Irgafos 168 | 0.6 | 0.6 |
| Irganox 565 | 0.3 | 0.3 |
| TOTAL | 100.9 | 100.9 |
| % Wt. Loss After 6 hrs @ 160° C. | 2.1 | 7.0 |
| $T_g$ (Calc'd, ° C.)[5] | −17.5 | −17.4 |
| SB/SIS Ratio | 0.86 | 0.86 |

[1]Normally solid tackifier ($T_s \approx 95°$ C.)
[2]ISPR ($T_s \approx 52–57°$ C.)
[3]Normally liquid tackifier ($T_s \approx 10°$ C.)
[4]Plasticizer oil
[5]Fox/Flory equation As seen in Table 1, although the Example 1 and Control 1 had the same $T_g$, Control 1 had a volatility 3.5 times higher than that of Example 1.

EXAMPLES 2–12 AND CONTROLS 1–4

To evaluate the effect of ISPRs on PSA performance and label converting, several different label constructions were made. In each case, HMPSA compositions were prepared in a one liter sigma-blade mixer, using the general compounding procedure described above. None of the controls contained an ISPR. Each formulation was coated onto a release liner using a hot-melt coater, at a coat weight of 20±2 g/m$^2$, and laminated to a paper facestock. Examples 1a, 1b, 2–6, 7a, 7b, 8a and 8b, and Controls 1–4, were laminated to 60 pound per ream (60#/ream) white semi-gloss paper. Examples 9–12 were laminated to 50#/ream International Paper white gloss facestock. Examples 1b, 7b, 8b, 9 and 10, and Control 4 each contained a small amount of calcium carbonate (Camel Wite, available from Genstar Stone Products Co., Hunt Valley, Md.).

The composition of each of Examples 1–12 and Controls 1–4 is presented in Table 2, with component amounts expressed in grams. Glass transition temperatures ($T_g$) were determined using a Rheometrics Mechanical Spectrometer (RMS-800) over a −75 to 75° C. temperature range, with a 3° C./step heating rate, generally in accordance with the procedure of P. Chang and H. Yang, "The Role of Viscoelastic Properties in the Design of Pressure-Sensitive Adhesives," *Trends in Polymer Science,* November 1977, Vol. 5, No. 11, at pages 380–384 (incorporated by reference herein). The testing frequency was 10 radians/sec. The samples were approximately 1–2 mm thick and 8 mm in diameter. The strain employed was about 1%. The temperature corresponding to the maximum value of the tangent delta (tan δ) curve was taken as the $T_g$.

Adhesive performance on high density polyethylene (HDPE) was evaluated for each of the examples, at both room and low temperature (about 0° C.). LoopTack was measured using FINAT Test Method No. 9. A loop of the sample construction was placed in the jaws of an Instron machine, with the adhesive exposed, and the sample was allowed to descend at a predetermined rate (12 in./min. (30.5 cm/min.)) to the surface of the substrate to cover an area approximately 1"×1" (2.54 cm×2.54 cm), and immediately thereafter, the sample was removed from the substrate. Peak force was reported as LookTack. 90° peel was measured using Pressure Sensitive Tape Council (PSTC) Test Method No. 1, but at a 90° angle, rather than a 180° angle. Adhesive performance data is presented in Table 2.

Converting performance of Examples 1b, 9–12 and Controls 3 and 4 was evaluated by subjecting a web of each label construction to die-cutting and matrix-stripping operations in a Mark Andy press, and recording the maximum press speed achieved before matrix breakage. Three different label configurations were tested: A 4-up configuration, with four labels across the web (using an X-die), a 1-up label, with one label across the web (using a V-die), and a 14-up configuration, with 14 labels across the web (using a W-die). The maximum attainable speed with a Mark Andy press is 1,000 ft./min. Converting test results are presented in Table 2.

TABLE 2

| | Example 1a | Control 1 | Example 2 | Control 2 | Example 3 | Example 4 |
|---|---|---|---|---|---|---|
| Formulation Summary | | | | | | |
| Kraton 1107 | 19.10 | 19.10 | | | 19.25 | |
| KX 604 | | | 21.10 | 21.10 | | 12.30 |
| Solprene 1205 | 16.40 | 16.40 | 13.60 | 13.60 | 19.25 | 24.20 |
| Escorez 2596 | 9.00 | 46.70 | 9.00 | 47.29 | | |
| Res-A-2514 | 55.50 | | 56.30 | | 41.50 | 42.50 |
| Wingtack 10 | | 10.10 | | 10.22 | 20.00 | 21.00 |
| Shellflex 371 | | 7.70 | | 7.79 | | |
| Camel Wite | | | | | | |
| Irgafos 168 | 0.60 | 0.60 | 0.60 | 0.60 | 0.60 | 0.60 |
| Irganox 565 | 0.30 | 0.30 | 0.30 | 0.30 | 0.30 | 0.30 |
| Adhesion Performance | | | | | | |
| Loop Tack from HDPE (N/25 mm) | | | | | | |
| At Room Temperature | 16.1 +/− 0.4 | 19.4 +/− 2.2 (pt) | 18.4 +/− 1.7 | 16.5 +/− 4.7 (pt) | 10.1 +/− 0.3 | 10.6 +/− 0.7 |
| At 0–1° C. | 6.3 +/− 1.7 | 0.4 +/− 0.2 | 5.1 +/− 1.4 | 0.4 +/− 0.3 | 8.1 +/− 2.1 (pt) | 11.1 +/− 2.1 |
| 90-deg Peel from HDPE (N/25 mm) | | | | | | |
| At Room Temperature | 8.7 +/− 0.8 (pt) | 11.4 +/− 0.4 (pt) | 8.4 +/− 0.4 (pt) | 11.1 +/− 1.8 (pt) | 4.5 +/− 0.1 | 5.1 +/− 0.4 |

| | Example 5 | Example 6 | Example 7a | Example 7b | Example 8a | Example 8b |
|---|---|---|---|---|---|---|
| Formulation Summary | | | | | | |
| Kraton 1107 | 24.50 | | 16.50 | 16.50 | | |
| KX 604 | | 24.50 | | | 20.60 | 20.60 |
| Solprene 1205 | 12.50 | 12.50 | 18.10 | 18.10 | 13.00 | 13.00 |
| Escorez 2596 | | | 9.00 | 9.00 | 9.00 | 9.00 |
| Res-A-2514 | 63.00 | 63.00 | 56.40 | 56.40 | 57.40 | 57.40 |
| Wingtack 10 | | | | | | |
| Shellflex 371 | | | | | | |
| Camel Wite | | | | 6.49 | | 6.49 |
| Irgafos 168 | 0.60 | 0.60 | 0.60 | 0.60 | 0.60 | 0.60 |
| Irganox 565 | 0.30 | 0.30 | 0.30 | 0.30 | 0.30 | 0.30 |
| Adhesion Performance | | | | | | |
| Loop Tack from HDPE (N/25 mm) | | | | | | |
| At Room Temperature | 13.1 +/− 1.3 | 13.1 +/− 2.9 | 15.9 +/− 1.5 | 16.7 +/− 1.7 | 17.5 +/− 0.7 | 17.2 +/− 1.7 |
| At 0–1° C. | 4.6 +/− 8.1 (pt) | 16.5 +/− 2.6 (pt) | 3.7 +/− 2.3 | 3.2 +/− 0.8 | 4.8 +/− 1.5 | 3.9 +/− 1.6 |
| 90-deg Peel from HDPE (N/25 mm) | | | | | | |
| At Room Temperature | 5.6 +/− 0.7 | 6.4 +/− 0.2 | 9.1 +/− 1.2 (pt) | 9.5 +/− 0.9 (pt) | 9.6 +/− 0.7 (pt) | 9.7 +/− 0.7 (pt) |

| | Example 1b | Example 9 | Example 10 | Example 11 | Example 12 | Control 3 | Control 4 |
|---|---|---|---|---|---|---|---|
| Formulation Summary | | | | | | | |
| Kraton 1107 | 19.10 | 21.10 | | 21.10 | | 23.50 | |
| Kraton 1113 | | | 21.10 | | 21.10 | | 17.61 |
| Solprene 1205 | 16.40 | 13.60 | 13.60 | 13.60 | 13.60 | 10.00 | 14.56 |
| Escorez 1310LC | | | | | | | 19.13 |
| Escorez 2596 | 9.00 | 6.00 | 6.00 | 9.00 | 9.00 | 48.00 | |
| Res-A-2514 | 55.50 | 59.30 | 59.30 | 56.30 | 56.30 | | |
| Permalyn 6110 | | | | | | | 15.87 |
| Wingtack 10 | | | | | | 10.50 | 32.83 |
| Shellflex 371 | | | | | | 8.00 | |
| Camel Wite | 6.44 | 6.44 | 6.44 | | | | 6.47 |
| Irgafos 168 | 0.60 | 0.60 | 0.60 | 0.60 | 0.60 | 0.60 | 0.50 |
| Irganox 565 | 0.30 | 0.30 | 0.30 | 0.30 | 0.30 | 0.30 | 0.25 |
| Tg (Rheological, ° C.) | 5.0 | 4.3 | 2.9 | 4.8 | 5.4 | 11.0 | 1.6 |

TABLE 2-continued

Adhesion Performance

Loop Tack from HDPE (N/25 mm)

| | | | | | | | |
|---|---|---|---|---|---|---|---|
| At Room Temperature | 17.8 +/− 0.7 | 15.4 +/− 0.4 | 15.8 +/− 0.8 | 18.9 +/− 0.7 | 19.2 +/− 1.3 | 18.5 +/− 0.5 (pt) | 3.1 +/− 0.1 |
| At 0–1° C. | 13.0 +/− 4.8 | 14.0 +/− 4.3 (pt) | 14.1 +/− 5.3 | 12.7 +/− 6.2 | 13.2 +/− 5.3 | 0.9 +/− 0.8 | 3.8 +/− 0.8 |

90-deg Peel from HDPE (N/25 mm)

| | | | | | | | |
|---|---|---|---|---|---|---|---|
| At Room Temperature | 8.1 +/− 0.6 | 7.9 +/− 0.6 | 7.9 +/− 0.2 | 8.7 +/− 0.3 | 8.5 +/− 0.5 | 7.0 +/− 1.4 (pt) | 6.7 +/− 0.3 |

Maximum Converting Speed (ft./min.)

| | | | | | | | |
|---|---|---|---|---|---|---|---|
| 4-up Label | 985 | 930 | 860 | 940 | 916 | 795 | 545 |
| 1-up Label | 980 | 0 | 965 | 925 | 865 | 380 | 0 |
| 14-up Label | 550 | 600 | 380 | 570 | 600 | 0 | 1000 |

EXAMPLE 13 AND CONTROLS 5 AND 6

Using the compounding and lamination techniques described above, Example 13 and Controls 5 and 6 were prepared, and their adhesive performance (Looptack and 90° peel) was measured. In each case, an HMPSA composition was coated on a release liner at a coat weight of 20±2 g/m² and laminated to a 60#/r high gloss white paper facestock. Facestock staining tests were performed on each of the samples, as well as on Example 5, described above. The facestock staining test was developed to measure the degree of adhesive staining of a paper facestock, by accelerated aging at elevated temperature. To perform the test, each construction was die-cut into four separate 4 in.×3 in. (10 cm×7.5 cm) samples, with the longer side being in the machine direction. Each sample was inserted between two aluminum plates having the same dimensions as the sample, and then placed in a 60° C. oven with a 1 kg weight situated at the center of the plates. For each example and control, a sample was removed from the oven after one, two and three weeks, allowed to cool to room temperature, and visually analyzed under fluorescent light and compared to the unaged sample. An unaged sample also was analyzed. Visual analysis looked for signs of facestock staining by low molecular weight components such as plasticizing oil or liquid resin. The number and size (area) of stains, and the relative degree of facestock staining was ranked according to the following gradation:

Ranking: 1–10; 10=no staining, 1=extreme staining.

Number of Stains: None<very few<few<many.

Stain Size: None<very small<small<medium<large.

The results are presented in Table 3.

TABLE 3

| Formulation Summary | Example 13 | Control 5 | Example 5 | Control 6 |
|---|---|---|---|---|
| Kraton 1107 | | 16.5 | 24.5 | 16.5 |
| KX 604 | 19.25 | | | |
| Solprene 1205 | 19.25 | 8.5 | 12.5 | 8.5 |
| Escorez 2596 | 20 | 46 | | 37 |
| Res-A-2514 | 41.5 | | 63 | |
| Wingtack 10 | | 14.5 | | 19 |
| Shellflex 371 | | 14.5 | | 19 |
| Camel Wite | | 8.5 | | 8.5 |
| Irgafos 168 | 0.6 | 0.6 | 0.6 | 0.6 |
| Irganox 565 | 0.3 | 0.3 | 0.3 | 0.3 |
| Tg (Rheological, ° C.) | 9.8 | 10.5 | −2.7 | −2.5 |
| Adhesion Performance | Example A | Control A | Example B | Control B |
| Loop Tack from HDPE (N/25 mm) | | | | |
| At Room Temperature | 20.2 +/− 1.7 | 12.6 +/− 0.7 | 13.1 +/− 1.3 | 8.5 +/− 0.5 |
| At 0–1° C. | 1.2 +/− 0.2 | 4.1 +/− 0.8 | 4.6 +/− 3.3 (pt) | 5.3 +/− 1.1 (pt) |
| 90-deg Peel from HDPE (N/25 mm) | | | | |
| At Room Temperature | 10.1 +/− 1.2 (pt) | 7.1 +/− 0.5 | 5.6 +/− 0.7 | 3.9 +/− 0.1 |
| Staining (@ 60° C.) | | | | |
| 2 weeks | 10 (none) | 7 (few, small) | 10 (none) | 4 (many, medium) |
| 3 weeks | 10 (none) | 5 (many, medium) | 9 (few, small) | 3 (many, large) |

As shown in Tables 2 and 3, normally solid tackifiers like Escorez 2596 and normally liquid tackifiers like Wingtack® 10 have an inverse effect on adhesion performance. Escorez 2596 enhances room temperature adhesive performance, such as loop tack on polyolefins and mandrel on cardboard. Direct substitution of Wingtack® 10 for Escorez 2596 in the same formulation, however, increases cold temperature performance at the expense of shear, mandrel on cardboard, and facestock staining. ISPRs like Res-A-2514 have a much more significant positive effect on loop tack and peel on cardboard than do non-ISPR tackifiers. Dual-rubber systems tackified with an ISPR and a lower percentage of normally solid tackifying resin have a wider application temperature range than systems having a similar $T_g$ tackified with a solid resin or a blend of liquid resin and a plasticizing oil. Facestock staining is also minimized with ISPR tackifiers relative to systems tackified with liquid resin and plasticizing oil formulated to a similar $T_g$.

This invention in its broader aspect is not limited to the specific details shown and described herein. Departures from such details may be made without departing from the principles of the invention and without sacrificing its chief advantages. As used herein, use of the word "about" in relation to a range of values is intended to modify both the high and low values recited.

What is claimed is:

1. A hot melt pressure-sensitive adhesive (HMPSA) composition, comprising:
   (a) one or more styrene-butadiene (SB) block copolymers;
   (b) one or more styrene-isoprene-styrene (SIS) block copolymers, or a mixture of SIS and styrene-isoprene (SI) block copolymers; and
   (c) a tackifying component having a ring and ball softening point of from about 35 to 60° C. and an aromatic content of from about 5 to 25% by weight, made by copolymerizing at least one $C_5$ monolefin or diolefin with at least one $C_8$ or $C_9$ monoalkenyl aromatic hydrocarbon; and
   wherein the weight ratio of (a):(b) ranges from about 0.5:1 to 2:1.

2. A HMPSA composition as recited in claim 1, wherein (a) and (b) together comprise about 20 to 50% by weight of the HMPSA composition.

3. A HMPSA composition as recited in claim 2, wherein (a) and (b) together comprise about 25 to 40% by weight of the HMPSA composition.

4. A HMPSA composition as recited in claim 1, wherein the tackifying component comprises about 50 to 80% by weight of the composition.

5. A HMPSA composition as recited in claim 1, wherein the tackifying component comprises 60 to 75% by weight of the HMPSA composition.

6. A HMPSA composition as recited in claim 1, wherein (a) comprises about 10 to 20% by weight of the HMPSA composition, and (b) comprises about 10 to 25% by weight of the HMPSA composition.

7. A HMPSA composition as recited in claim 1, wherein the tackifying component has a ring and ball softening point of from 50 to 60° C.

8. A HMPSA composition as recited in claim 1, further comprising a positive amount up to 10% by weight of one or more normally solid or normally liquid tackifiers.

9. A HMPSA composition as recited in claim 1, further comprising a positive amount up to 7% by weight of a plasticizer.

10. A HMPSA composition as recited in claim 1, further comprising a positive amount up to 10% by weight of a rosin or rosin ester.

11. A HMPSA composition as recited in claim 1, coated on or laminated to a flexible facestock.

12. A HMPSA composition as recited in claim 11, wherein the flexible facestock is a paper facestock having a basis weight of from about 50 to 60 pounds per ream.

13. An improved tape or label construction, comprising:
   a facestock; and
   a HMPSA composition coated on or laminated to the facestock, said HMPSA composition comprising (a) one or more SB block copolymers, (b) one or more SI and/or SIS block copolymers, and (c) a tackifying component having a ring and ball softening point of from 35 to 60° C. and an aromatic content of from 5 to 25% by weight, made by copolymerizing at least one $C_5$ monolefin or diolefin with at least one $C_8$ or $C_9$ monoalkenyl aromatic hydrocarbon.

* * * * *